(12) United States Patent  
Gibson (10) Patent No.: US 11,685,119 B2
(45) Date of Patent: Jun. 27, 2023

(54) ENHANCED FUSED FILAMENT MULTI-COLOR THREE-DIMENSIONAL (3D) PRINTING

(71) Applicant: Christopher John Gibson, Cambridge (CA)

(72) Inventor: Christopher John Gibson, Cambridge (CA)

( * ) Notice: Subject to any disclaimer, the term of this patent is extended or adjusted under 35 U.S.C. 154(b) by 134 days.

(21) Appl. No.: 16/833,976

(22) Filed: Mar. 30, 2020

(65) Prior Publication Data

US 2020/0307094 A1    Oct. 1, 2020

Related U.S. Application Data

(60) Provisional application No. 62/825,318, filed on Mar. 28, 2019.

(51) Int. Cl.
| | |
|---|---|
| *B29C 64/35* | (2017.01) |
| *B33Y 30/00* | (2015.01) |
| *B33Y 40/00* | (2020.01) |
| *B29C 64/209* | (2017.01) |
| *B29C 64/118* | (2017.01) |

(52) U.S. Cl.
CPC ............ *B29C 64/35* (2017.08); *B29C 64/118* (2017.08); *B29C 64/209* (2017.08); *B33Y 30/00* (2014.12); *B33Y 40/00* (2014.12)

(58) Field of Classification Search
CPC ...... B29C 64/35; B29C 64/209; B29C 64/118
See application file for complete search history.

(56) References Cited

U.S. PATENT DOCUMENTS

| | | | | |
|---|---|---|---|---|
| 4,182,444 | A | * | 1/1980 | Fisher .................... B65G 45/16 198/497 |
| 2019/0263059 | A1 | * | 8/2019 | Ferguson ............... B33Y 30/00 |
| 2020/0180221 | A1 | * | 6/2020 | Borrell Carbonell ........................ B29C 64/393 |
| 2020/0269529 | A1 | * | 8/2020 | De Kock .............. B29C 70/525 |

* cited by examiner

*Primary Examiner* — Xiao S Zhao
*Assistant Examiner* — John J DeRusso (57) ABSTRACT

A retractable purging mechanism is preferably comprised of a bracket that is connectable to a 3D printer. An actuatable shaft is secured to the bracket and the shaft engages a rocker arm, which in turn engages a collecting tray and moves the collecting tray from a first position to a second position. The collecting tray is adapted to receive a material that is discarded when, for example, a different print colour is used in 3D printing. A sweeper is also provided, the sweeper connected to the collecting tray to remove the material from the collecting tray.

10 Claims, 9 Drawing Sheets

ENHANCED FUSED FILAMENT MULTI-COLOR THREE-DIMENSIONAL (3D) PRINTING

FIELD

This disclosure relates to the field of additive manufacturing using a type of industrial robot under computer control to form successive layers of material to create a three-dimensional object from a 3D computer model. More specifically, this disclosure relates to a deposition method of manufacturing such as fused filament fabrication. This disclosure augments systems that provide colorization by the use of multiple colored materials being mixed, switched, or colorized prior to or during fusing to produce a colorization of the manufactured 3D object as specified in the computer model.

BACKGROUND

As computers within manufacturing have advanced so have methods of producing 3D computer models and the ability to manufacture these models into objects using rapid prototyping techniques of which additive manufacturing is one of these techniques. There exists many methods to accomplish colorization, such as: multiple printheads each extruding a different colored material, splicing different coloured filaments together before being deposited onto the model using a single printhead; switching different colored filament into a single deposition printhead; and proportionally applying multiple colored filaments into a single deposition printhead and blending the materials together while molten, before deposition. There are common difficulties and tradeoffs with all these techniques Therefore, there remains a need to produce enhanced or augmented methods to reduce the difficulties in printing with the above-mentioned methods.

SUMMARY

The current disclosure provides a retractable purging apparatus for three dimensional (3D) printing comprising a bracket to connect to a 3D printer; an actuatable shaft secured to the bracket; a rocker arm attached to the shaft, the rocker arm pivotable about an axis; a collecting tray operatively engaged to the rocker arm to receive a material of the 3D printer; and, a sweeper connected to the collecting tray to remove the material from the collecting tray.

BRIEF DESCRIPTION OF THE DRAWINGS

The disclosure will now be described in detail, with reference to the accompanying drawings of preferred and exemplary embodiments, in which.

DESCRIPTION OF THE PREFERRED EMBODIMENTS

There are many methods known in the art but this disclosure relates to fused filament fabrication using standard filaments of polylactic acid (PLA), Acrylonitrile Butadiene Styrene (ABS) or others. Typically, a filament is driven into a heated chamber where it is liquefied and then extruded out of a nozzle in a controlled manner as the nozzle is moved about a single printing plane in two dimensions, typically X and Y. This is repeated for subsequent planes, or layers, being stacked upon the previous planes which define a third dimension, typically in the Z axis. Fused Filament Fabrication (FFF) printers include an extruder having various sections. The extruder uses a motor with drive wheels to drive filament from a spool into a cold end portion of the extruder. The cold end must remain at a temperature low enough that the filament will not melt or become soft. The filament is then passed into a hot end portion. This portion is typically electrically heated and temperature monitored and controlled to within a few degrees of a desired set point. The filament becomes molten and liquefies in the hot end. The pressure exerted from the cold filament forces the liquid out of the hot end nozzle tip. The tip opening is very small and is typically less than 1 mm. The rate in which the filament is driven controls the amount of material that is deposited during the print. Colorization is provided for by a number of techniques.

One such colorization method is using multiple printheads each extruding a different colored material. The colors are restricted to the number of printheads. When a color change is required the active printhead is parked and the inactive printhead of the appropriate color is activated and printing continues. The disadvantage of this method is the size of plurality the printheads increases weight and reduces the usable print area as the nozzles are necessarily spaced apart.

Another colorization method is splicing different coloured filaments together to form a single contiguous filament before being deposited onto the model using a single printhead. This technique requires careful measurement of the filament and the individual lengths are determined by look ahead algorithms into the machine code that controls the printing (typically G-Code). The color switching is only as accurate as the filament driving mechanism. Unwanted transitional colors may be purged prior to continuing the printing process.

Another colorization method is switching different colored filament into a single deposition printhead. With this technique a plurality of different colored filaments are made available to the single deposition printhead. A mechanism selects amongst the different filaments and feeds only a single strand into the printer head. When a color change is required, the extruder motor will retract the filament entirely from the printhead. The new desired colored filament will then be mechanically selected and fed into the printhead. Unwanted transitional color may be either purged or used for internal infill.

The previous colorization methods all have one thing in common, they print only the color of the base filament. This next colorization method can blend multiple filaments in various proportions and blend these filaments together in a molten state to form a new color. For example, yellow, cyan, magenta, white and black may be combined to produce a gamut of color. In this method multiple filaments are proportionally driven into the hot end of the printhead and then blend together while molten by a mixing means before deposition. Again, unwanted transitional color may be either purged or used for internal infill.

In all the methods mentioned above purging of unwanted transitional color may be required. The speed of purging is hampered by the combination of the maximum pressure that can be applied to the filament and the tiny nozzle orifice diameter in which purged material must escape. An active mixing means compounds the problem because the maximum pressure of the mixer seal must also be considered.

The disclosure is directed at a system, apparatus and method for enhancing the performance of all of the colorization methods described above.

Figure 1:
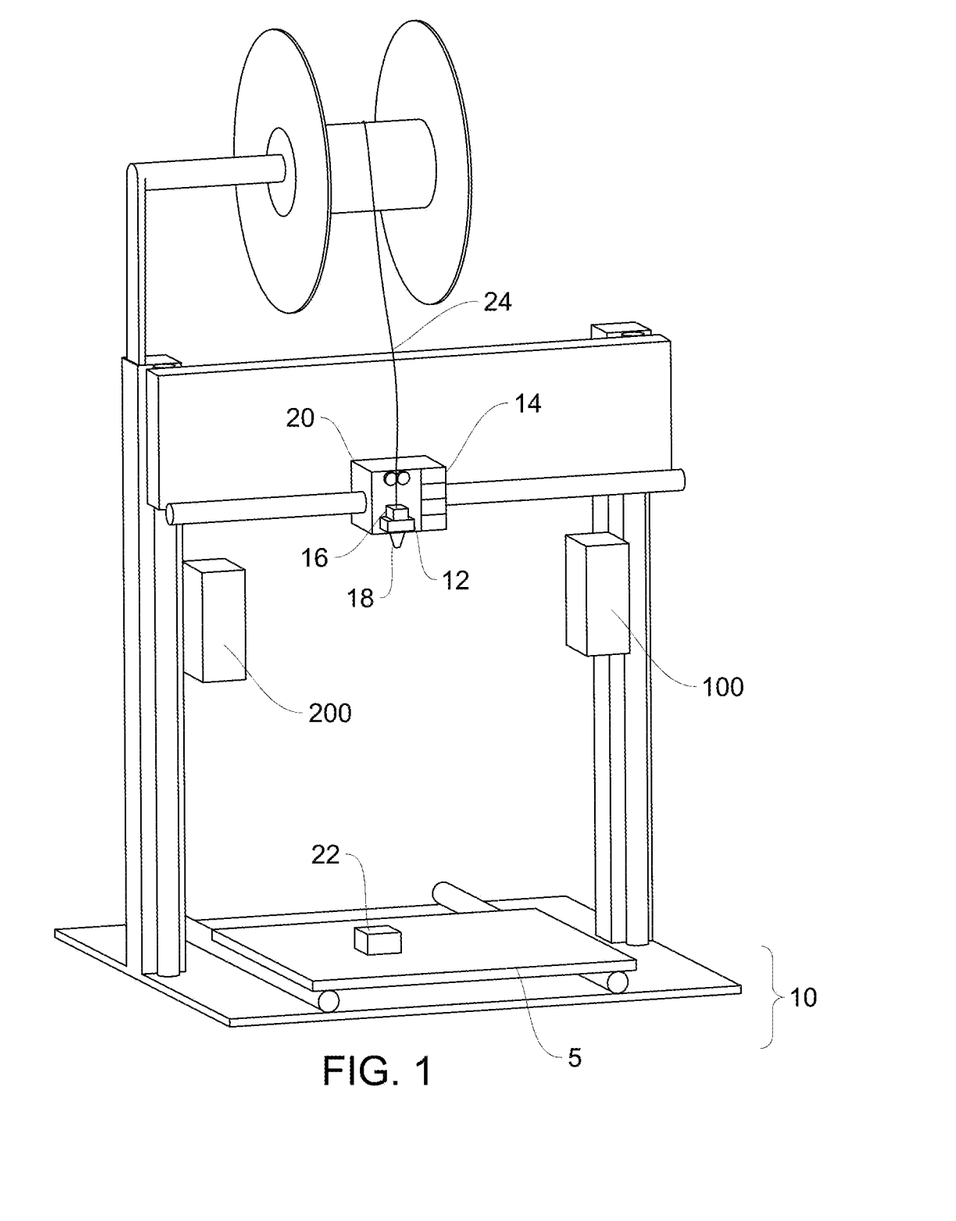
FIG. 1 is a diagram of the fused-filament color 3D printing system with enhancements.
Figure 4:
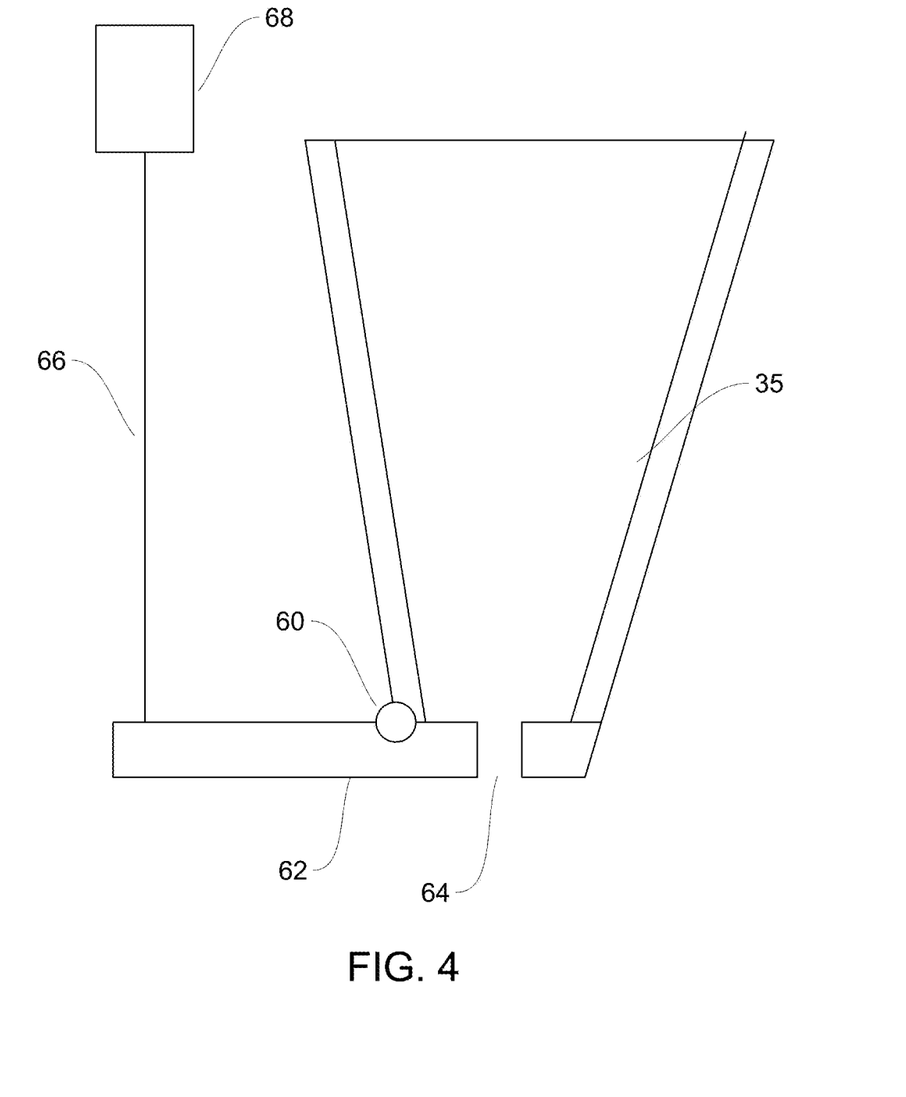
FIG. 4 is an internal view of an activatable purge channel.

Turning to FIG. 1 the enhanced 3D color printing system 10 is shown. In the preferred embodiment a 3 axis cartesian frame based 3D printer is used and these are well known in the art. This printer has a single spool of filament 24. This filament 24 is fed into the printhead 20 where it is liquified at the hotend 12. Molten material is extruded out the nozzle 18 onto the 3D model being fabricated 22. The enhancements will now be itemized and later individually explained. A first enhancement is located in the printhead 20. This enhancement is liquid colorization 14 added to the molten filament in the mixing section 16. The next enhancement, an impeller (34 shown in FIG. 2a) is located in mixing section 16. The next enhancement, quick change nozzle 18 is removed and replaced in section 100. The nozzle 18 is enhanced with an activatable enlarged purge channel (FIG. 4). Purged material may be collected and removed in enhancement section 200.

Figure 2A:
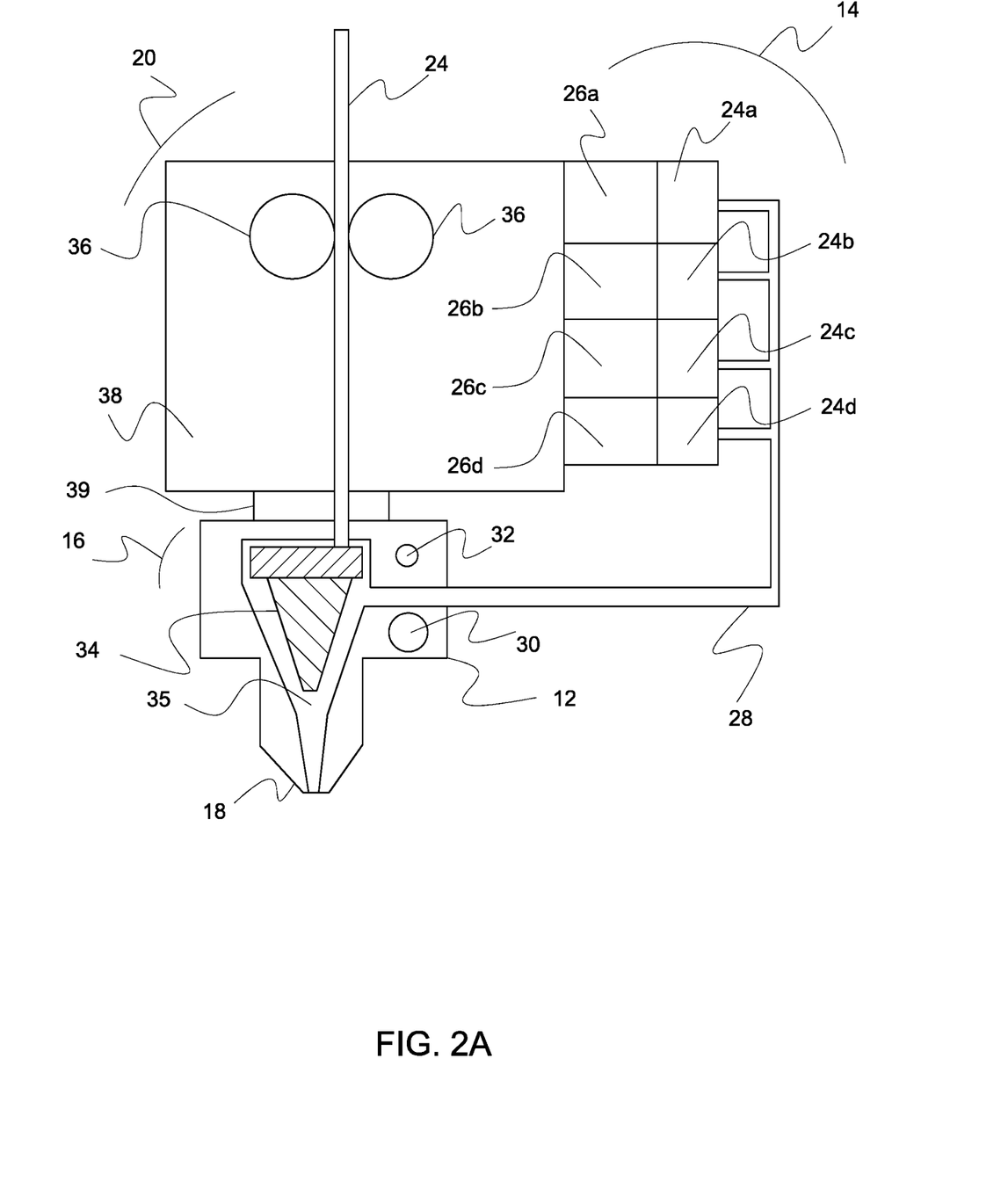
FIG. 2a is an internal view of the liquid colorant addition to the molten filament.

Turning to FIG. 2a, and referencing FIG. 1, a first embodiment of the liquid colorant additive apparatus 14 is shown. In this embodiment the extruder hotend 12 of the printhead 20 is adapted to receive liquid colorant 26 through manifold 28. The printhead 20 directly drives the filament 24 using drive wheels 36, driven by a stepper motor under computer control (not shown). The filament 24 travels through a narrow channel in the cold stage 38 and passes through a thermal isolation gasket 39. This may be any suitable insulating material with enough strength to hold the hot end 12. The hot end 12 is heated with electric heater 30 and the temperature is measured by sensor 32. The heater temperature is precisely computer controlled. The filament 24 becomes liquified in the mixing cavity 35. Liquid pressure is produced by the driving wheels 36. Now also refer to FIG. 3a and FIG. 3b. The mixing impeller 34 has driving fins 50 (FIG. 3b) located on the top of the impeller 34, or around the circumference of the impeller like a water wheel, in which case the filament would be fed in at a right angle to the impeller. The pressurized liquid filament 24 will cause the impeller 34 to rotate as the liquid squeezes around the top of the impeller. The liquid filament 24 is then fed into the bottom portion of the impeller 34 (FIG. 3a) where the lower fins 52 combines the liquid colorant 26 (FIG. 2a) in the mixing cavity 35 (FIG. 2a). This mixing operation provides a homogeneous color. This color material is then extruded out the nozzle 18 and deposited onto the 3D model 22 (FIG. 1) being fabricated. This method requires only a single filament 24 per mixing printhead 20 and the material typically has a white or neutral base color. The liquid colorant 26 is preferably concentrated and contained in a small cartridges 26a, 26b, 26c, 26d mounted directly to the printhead 20 and may provide sufficient colorization for several objects. Piezoelectric buzzer pumps 24a-d are used in the embodiment to inject proportional amounts of different colorants into the filament stream. In this embodiment Cyan 26a, magenta 26b, yellow 26c, and black 26d colorants are used. In FIG. 2A the distance of the colorant manifold 28 to the hot end 12 is made as physically short as possible in the actual implementation.

Figure 2B:
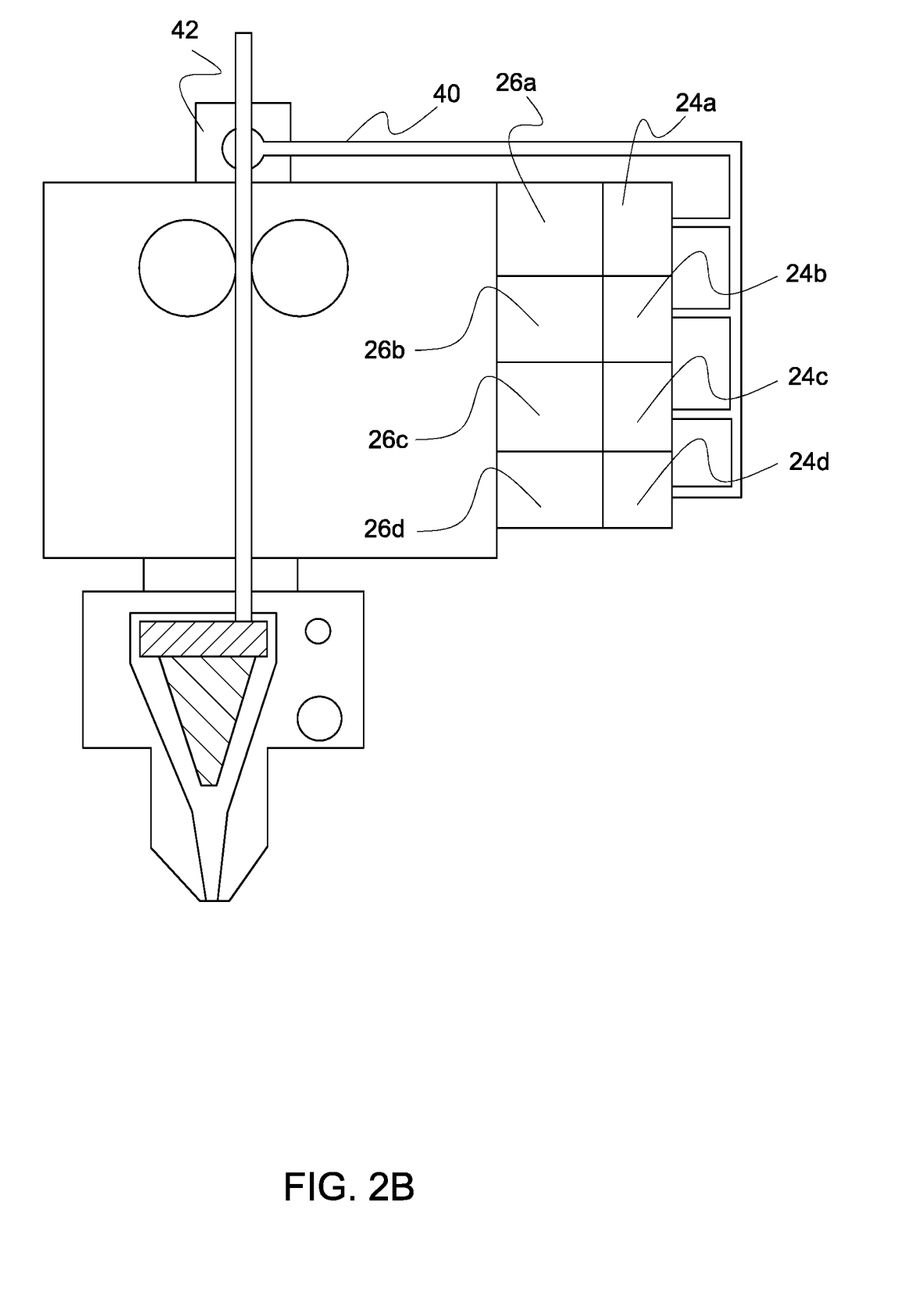
FIG. 2b is an internal view of the liquid colorant addition to the solid filament.

Referring to FIG. 2b a second liquid colorant embodiment is shown. In this embodiment the cold solid filament 24 is colorized by coating with concentrated liquid colorants 26 in cavity 42 through manifold 40 prior to liquefaction in the hotend and mixing. All other methods are the same as stated in the paragraph above for FIG. 2a. The distance of the colorant manifold 40 to the coloring cavity 42 is made as physically short as possible in the actual implementation. It should also be clear that colorant can also be added past the nozzle onto the freshly extruded material and a figure is not needed to illustrate this.

Figure 3A:
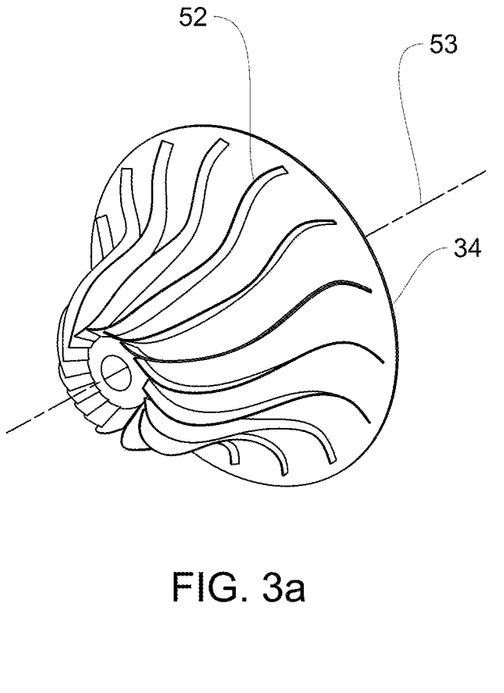
FIG. 3a is a side view of the bottom of the impeller driven mixer.
Figure 3B:
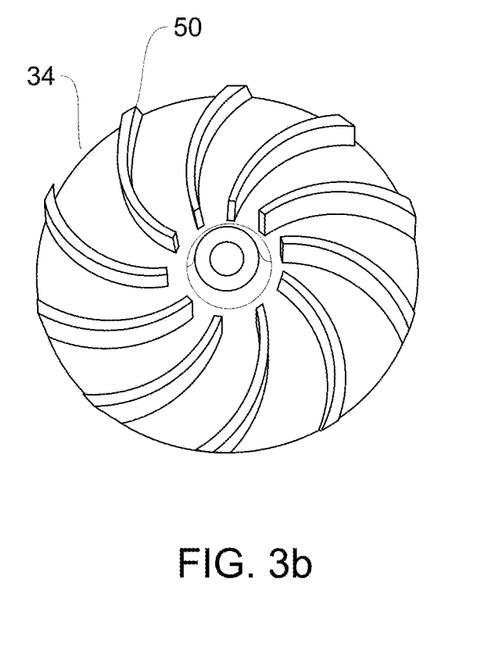
FIG. 3b is a top view of the driver fins of the impeller driven mixer.

Referring again to FIG. 3 the enhanced passive impeller 34 mixing system is further described. The impeller 34 is adapted to rotate freely on axis 53. As previously described, the fluid pressure of the molten filament 24 will cause the impeller 34 to rotate. Shear forces caused by fins 52 will mix the molten material to blend either added liquid colorant or it can be used with multiple filaments of different base color. This mixing method does not require the rotating shaft axis 53 to extend beyond the mixing compartment and therefore a shaft seal is not needed, thus greatly increasing the operating life of the mixer.

Turning to FIG. 4 an enhanced material purge mechanism is shown. This figure details the mixing cavity 35 of a hotend 12 (FIG. 1) of a mixing printhead 20 (FIG. 1). The Nozzle orifice 64 is adapted with a retractable wastegate 62. The wastegate 62 can be activated by electrical or mechanical means. In the preferred embodiment the wastegate 62 is pivoted on axis 60 by linkage 66 as computer controlled by linear actuator 68; such that the effective opening on the nozzle orifice 64 is many times larger. This allows rapid purging of unwanted material, such as transitional color that may occur in the mixing operation.

Figure 5:
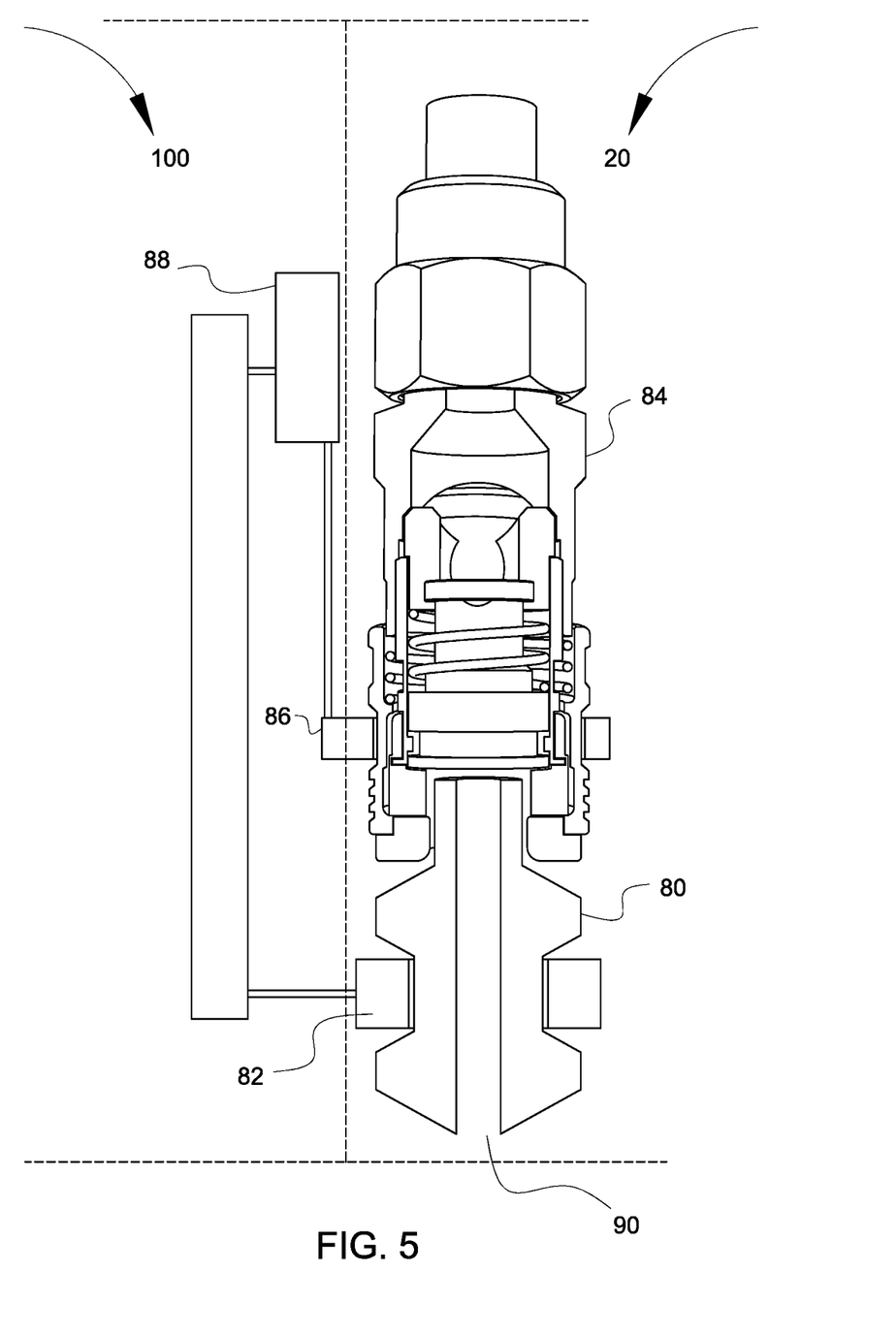
FIG. 5 is an internal view of a quick change nozzle mechanism.
Figure 6:
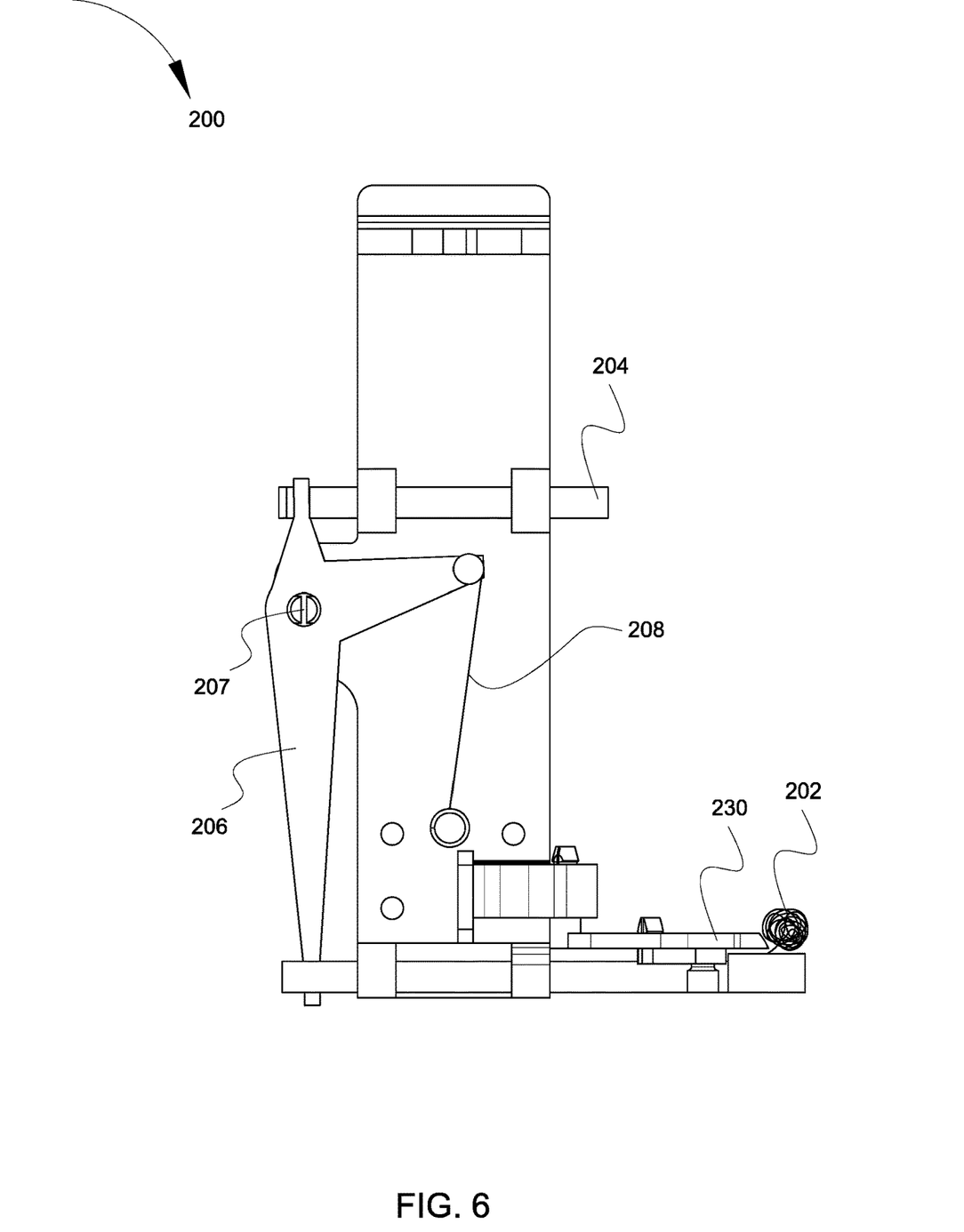
FIG. 6 is a side view of a mechanically retractable purge mechanism.
Figure 7:
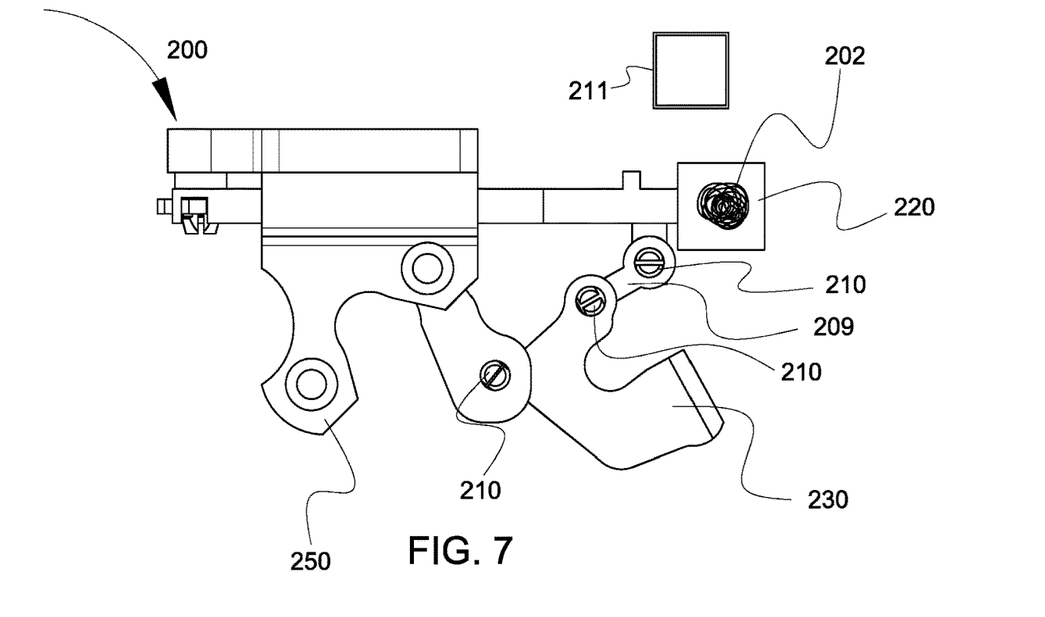
FIG. 7 is a top view of a mechanically retractable purge mechanism.
Figure 8:
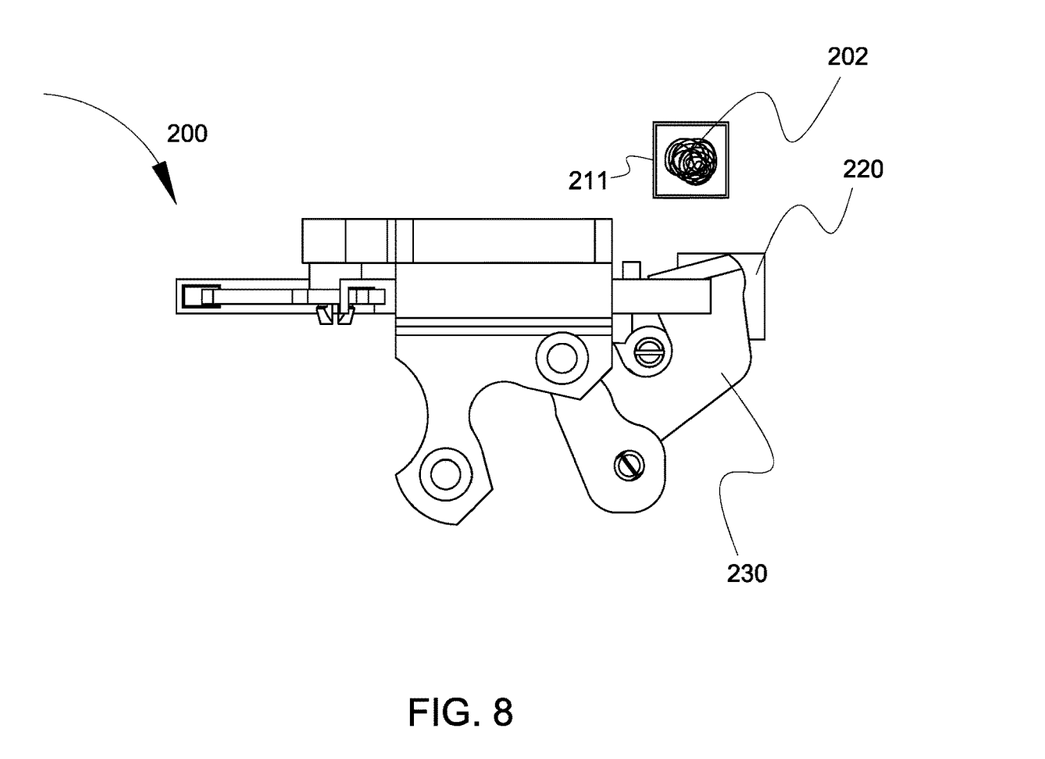
FIG. 8 is a top view of a mechanically retractable purge mechanism in the retracted state; and, FIG. 9 is a top view of an electronically activated retractable purge mechanism.

Referring to FIG. 5 the internal mechanism 100 of a quick change nozzle is shown. This embodiment is an alternative to the wastegate 62 shown in FIG. 4. Typically a nozzle orifice 90 is about 0.5 mm in diameter with typical feed rates of 200 mm per minute of filament will take a long time to purge unwanted transitionally colored material. This embodiment removes the nozzle 80 to allow a large channel to be available to purge material, typically the same diameter as the filament 24 (FIG. 1 and FIG. 2) Typically 1.75 mm or 3 mm. This is an increase of 12.25 to 36 times the volume per minute for the typical exemplary values given here. This quick change mechanism consists of the components located on printhead 20 and components located on the automatic change mechanism 100: The printhead 20 is adapted to include a locking sealed (watertight) receptacle 84 and the nozzle 80 (quick change nozzle) adapted to mate with the receptacle 84. The quick change mechanism 100 has a bracket 82 adapted to hold the removed nozzle 80. It should be clear that a plurality of brackets 82 may be used to hold a plurality of nozzles 80. The nozzle quick change activation stage 86, 88 consists of a bracket 86 that will release the quick change receptacle 84 while nozzle 80 is being held by bracket 82. Release bracket 86 is activated by the linear actuator 88 under computer control; The operation is reversed to re-install the nozzle 80. If material purging is required during printing operation, such as during color changing, the printhead 20 will be automatically moved to a unload area 100; the nozzle 80 will be detached; the printhead 20 will move to a purge area 200 (described below) where material is released; then the printhead 20 returns to the load area 100 to have the nozzle 80 attached and printing can continue. The small amount of material left in the nozzle itself may be additionally purged or used for internal infill on the model being fabricated 22 (FIG. 1). Or a previously cleaned or new unused nozzle could be added instead so no further purging would be required. Also this system would allow nozzles with different orifice sizes to be switched during different aspects of the print. for instance a larger nozzle for large features which would reduce print time and a smaller nozzle for fine details Turning to FIG. 6 (side view) and referring to FIG. 7 (top view) and FIG. 8 (top view) a mechanically activated retractable purge material removal mechanism 200 is shown. This mechanism is adapted to allow a collection place for waste material while it is being purged from the printhead 20. Purging is done to prime the flow of material through the nozzle after a tool change; after a non-printing waiting time has occurred; or after changing colors or materials. In prior art, this waste material is built upon the active area of the print bed during the printing operation and continues to consume more and more of the print volume during this time. The improved method will purge the material in one location not on the print bed (5 FIG. 1), preferably using a high speed travel such as forming a hollow cylinder or a shapeless lump (blob 202). When the purge operation is completed a mechanical arm will be activated to remove the blob 202 from the purge area. This print area is then available for the next purge operation. The removed material may be captured in a suitable way for disposal or reuse. In this first embodiment a mechanically activated mechanism 200 is shown In FIG. 6. This mechanism 200 is connected to the structural portion of the 3D printer such that it does not move but is located within the reach of the printhead 20. The shaft 204 is moved by the printhead. The shaft 204 will move rocker arm 206 around pivot 207. The rocker arm 206 is retained in place by spring 208. The rocker arm 206 will push against linkages (FIG. 7) 209 held by multiple pivots 210 until the flicker portion on arm 230 will snap the blob 202 off of the collection area 220 into a suitable receptacle 211. The extended flicker 230 is shown in FIG. 8. The angle of the flicker 230 is designed to cause the blob 202 to be dislodged towards an appropriate catching location 211. The blobs 202 can be disposed of or sorted by color and reused to make new filament. This enhancement allows the entire print bed to be utilized for fabricating the 3D model 22. The purge platform 220 has a metal base coated with Kapton® or PEI tape or some other suitable material such that the blob 202 waste material will adequately adhere during the purge operation, and then release the blob during the dislodging (flicking) operation. In another embodiment the active print bed 5 (FIG. 1) is used to form the blob. This method may be used if the printer cannot move the printhead beyond the confines of the print bed. The flicker portion of the arm 230 is adapted such that it will reach the blob 202. In this manner the purge material does not continue to grow and consume print volume.

Figure 9:
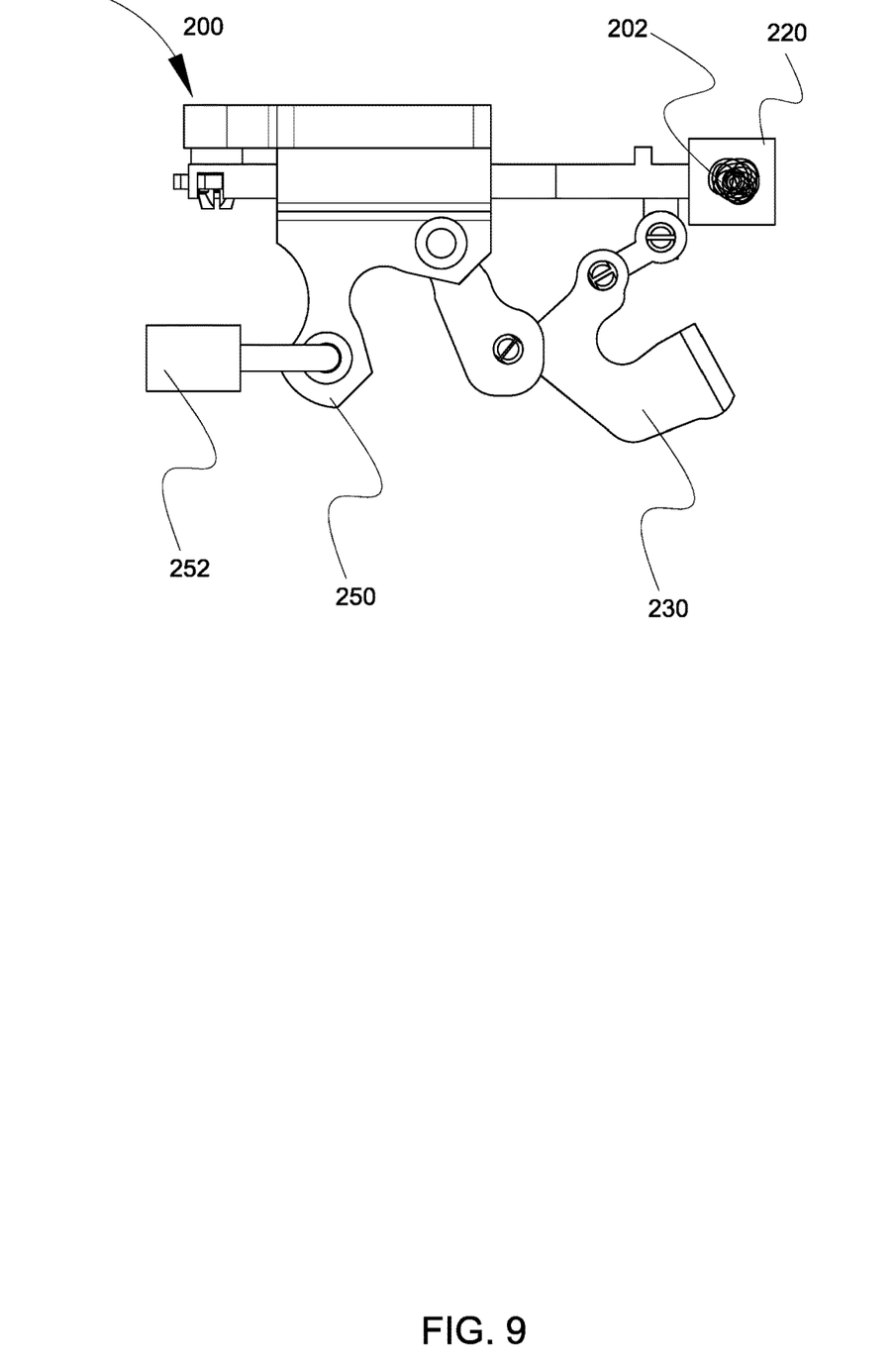

Turning to FIG. 9 an electrically activated retractable purge material removal mechanism 200 is shown from the top view. This embodiment performs the same functions as the mechanically activated mechanism shown in FIG. 6, FIG. 7, and FIG. 8. Again, in this implementation waste material will be purged in one location of the print bed or on the purge platform 220, preferably using a high speed travel such as forming a hollow cylinder or a shapeless lump (blob 202). When the purge operation is completed an electrical motor linear actuator 252 will be activated by computer control to remove the blob 202 from the print bed or purge platform 220. This activation is controlled by an electrical signal from the control electronics as directed by the computer commands performing the print operation. In this embodiment a special G-Code command is used, but other methods of activation are anticipated, such as using a sensor to detect a particular location of the printhead. The electrical actuator 252 will push linkage at location 250, snapping the flicker 230 as described in the previous paragraph.

With further reference to FIGS. 6, 7, 8 and 9 and according to an embodiment of the present disclosure, the retractable purging apparatus 200 is shown moving from a first position, whereby the sweeper 230 is in a position at rest (i.e. not sweeping) to a second position, whereby the sweeper 230 is in a sweeping position (i.e. sweeping a material, known as the blob or excess filament 202). The first position is specifically shown in FIGS. 7 and 9, while the second position is specifically shown in FIGS. 6 and 8. To move from the first to the second position, a device such as a printer head (not shown) or motor 252 actuates the shaft 204, which in turn moves the rocker arm 206 about pivot point 207, which then moves the collecting tray 220. As the collecting tray 220 moves from the first position to the second position in this fashion, the sweeper 230, which is connected to the collecting tray 220, pivots about points 210 and necessarily moves from a non-sweeping position to a sweeping position, sweeping the material 202 off of the collecting tray 220 and into the receptacle 211 receptacle.

In the preceding description, for purposes of explanation, numerous details are set forth in order to provide a thorough understanding of the embodiments; however, the specific details are not necessarily required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

The invention claimed is:

1. A three-dimensional (3D) printer comprised of a retractable purging apparatus, the retractable purging apparatus comprising:
   a bracket to connect to another portion of the 3D printer;
   an actuatable shaft secured to the bracket;
   a rocker arm attached to the actuatable shaft, the rocker arm pivotable about an axis;
   a collecting tray operatively engaged to the rocker arm to receive excess filament during 3D printing of an object from the 3D printer; and,
   a sweeper connected to the collecting tray to remove the excess filament from the collecting tray,
   wherein the excess filament is generated by at least one of: priming a flow of filament through the 3D printer; effecting a non-printing waiting time of the 3D printer; and, changing the filament color or material.

2. The 3D printer of claim 1, wherein the retractable purging apparatus is further comprised of a spring to bias the rocker arm in a position.

3. The 3D printer of claim 1 wherein the rocker arm engages linkages to pivot the sweeper.

4. The 3D printer of claim 1 wherein the sweeper is further comprised of an edge to sweep a surface of the collecting tray.

5. The 3D printer of claim 1 wherein the collecting tray has a base coated with a substance to facilitate receiving and removing the excess filament.

6. The 3D printer of claim 1 wherein the shaft is actuatable by an electrical motor.

7. The 3D printer of claim 1 wherein the collecting tray moves from a first position to a second position.

8. The 3D printer of claim 7 wherein movement of the collecting tray from the first position to the second position pivots the sweeper from a corresponding rest position to a sweeping position to sweep off the excess filament.

9. The 3D printer of claim 1, wherein the retractable purging apparatus is further comprised of a receptacle to collect the excess filament.

10. The 3D printer of claim 1 wherein the shaft is actuatable by a head of the 3D printer.

* * * * *